(12) United States Patent
Lan

(10) Patent No.: US 10,585,232 B2
(45) Date of Patent: Mar. 10, 2020

(54) LED LAMP HAVING INTERCONNECTED SLOTTED LIGHT GUIDE SUBSTRATES

(71) Applicants: The Design House, LLC, Nashville, TN (US); The Newish Product Ltd., Bingjiang, Hangzhou (CN)

(72) Inventor: Pinghai Lan, Hangzhou (CN)

(73) Assignees: The Design House, LLC, Nashville, TN (US); The Newish Products LTD, Bingjiang, Hangzhou (CN)

( * ) Notice: Subject to any disclaimer, the term of this patent is extended or adjusted under 35 U.S.C. 154(b) by 0 days.

(21) Appl. No.: 14/824,917

(22) Filed: Aug. 12, 2015

(65) Prior Publication Data

US 2016/0238776 A1    Aug. 18, 2016

(30) Foreign Application Priority Data

Feb. 13, 2015    (CN) .................... 2015 2 0105329 U

(51) Int. Cl.
| | | |
|---|---|---|
| *F21K 9/23* | (2016.01) | |
| *F21V 8/00* | (2006.01) | |
| *F21K 9/61* | (2016.01) | |
| *F21V 3/00* | (2015.01) | |
| *F21Y 115/10* | (2016.01) | |

(52) U.S. Cl.
CPC .............. *G02B 6/0075* (2013.01); *F21K 9/61* (2016.08); *F21V 3/00* (2013.01); *G02B 6/0036* (2013.01); *G02B 6/0041* (2013.01); *G02B 6/0043* (2013.01); *F21Y 2115/10* (2016.08); *G02B 6/006* (2013.01)

(58) Field of Classification Search
CPC .. G02B 6/0031; G02B 6/0068; G02B 6/0028; G02B 6/0038; G02B 6/0036; G02B 6/0016; G02B 6/002; G02B 6/0075; G02B 6/0088; F21K 9/23; F21K 9/232
USPC .................... 362/609, 610, 615, 616, 621
See application file for complete search history.

(56) References Cited

U.S. PATENT DOCUMENTS

| | | | | |
|---|---|---|---|---|
| 5,390,436 | A * | 2/1995 | Ashall .................. | G02B 6/0043 362/618 |
| 5,688,042 | A * | 11/1997 | Madadi .................... | F21V 3/00 362/240 |
| 6,217,186 | B1 * | 4/2001 | Fisher .................. | G02B 6/0043 362/627 |
| 6,621,222 | B1 * | 9/2003 | Hong ........................ | F21V 3/02 315/272 |
| 6,880,962 | B2 * | 4/2005 | Coushaine ........... | G02B 6/0021 257/E25.02 |
| 7,478,942 | B2 * | 1/2009 | Kim ..................... | G02B 6/0036 349/65 |
| 7,726,836 | B2 * | 6/2010 | Chen ....................... | H05K 1/14 361/760 |

(Continued)

*Primary Examiner* — Ismael Negron
(74) *Attorney, Agent, or Firm* — Kilpatrick Townsend & Stockton LLP

(57) ABSTRACT

LED lamp including a plurality of light guide substrate, a mounting seat, an LED lamp panel positioned on the mounting seat and having at least on LED facing an incident surface of the light guide substrate, and a diffuser enclosing the light guide substrates. Each one of the light guide substrate feature a notch configured such that the light guide substrate are coupled transverse to one another by the notches, and further include a plurality of diffused reflection elements for extracting light from the light substrate.

8 Claims, 5 Drawing Sheets

(56) References Cited

U.S. PATENT DOCUMENTS

| | | | | |
|---|---|---|---|---|
| 8,415,865 B2* | 4/2013 | Liang | ............... | G02B 6/0006 |
| | | | | 313/46 |
| 8,536,807 B2* | 9/2013 | Lin | ............... | F21V 3/00 |
| | | | | 315/358 |
| 8,625,940 B2* | 1/2014 | Yu | ............... | B32B 38/06 |
| | | | | 385/27 |
| 8,641,261 B2* | 2/2014 | Cheng | ............... | G02F 1/133615 |
| | | | | 349/58 |
| 8,941,795 B2* | 1/2015 | Garelli | ............... | G02B 6/001 |
| | | | | 349/61 |
| 8,947,002 B2* | 2/2015 | Le Toquin | ............... | H05B 33/0857 |
| | | | | 315/185 R |
| 9,261,638 B2* | 2/2016 | Wang | ............... | F21S 8/00 |
| 9,268,082 B2* | 2/2016 | Van Dijk | ............... | G02B 6/0036 |
| 9,488,767 B2* | 11/2016 | Nava | ............... | G02B 6/0001 |
| 2004/0145915 A1* | 7/2004 | Kim | ............... | G02B 6/0036 |
| | | | | 362/559 |
| 2005/0160697 A1* | 7/2005 | Oliphant | ............... | E04H 12/02 |
| | | | | 52/843 |
| 2007/0153548 A1* | 7/2007 | Hamada | ............... | G02B 6/0036 |
| | | | | 362/615 |
| 2009/0135627 A1* | 5/2009 | Furuyama | ............... | G02B 6/0055 |
| | | | | 362/621 |
| 2012/0140517 A1* | 6/2012 | Sakamoto | ............... | G02B 6/0036 |
| | | | | 362/607 |
| 2015/0029742 A1* | 1/2015 | Chen | ............... | F21K 9/64 |
| | | | | 362/555 |
| 2015/0212263 A1* | 7/2015 | Tzeng | ............... | F21V 17/12 |
| | | | | 362/555 |

* cited by examiner

LED LAMP HAVING INTERCONNECTED SLOTTED LIGHT GUIDE SUBSTRATES

FIELD OF THE INVENTION

The present invention relates to the field of lamps for illumination or decorative illumination.

BACKGROUND OF THE INVENTION

A tungsten lamp is an incandescent lamp having filaments made of tungsten filaments, wherein the filaments are heated by electricity to an incandescent state and to emit visible electric light.

The tungsten lamp has the following shortcomings:

1, high heat is produced by electricity, high electricity is consumed, and the energy efficiency is low;

2, the tungsten lamp can only be made into a relatively high-voltage product, so the safety performance of the product is low;

3, the tungsten filaments are easily oxidized, so internal sealing is required; the toughness of the tungsten filaments is low, so the stability of the product is low;

4, a product with a filament of a complex shape, such as an Edison lamp, requires great care in manufacturing, so the production efficiency is low; and 5, the housing which can only be made of glass is fragile and poor in safety.

Aiming at the problems of the traditional tungsten lamp, the prior art discloses a lamp using light emitting diodes (LEDs) to substitute tungsten filaments. In the lamp, LED wafers are connected in series and in parallel with each other in such a way as to mimic the look of tungsten filaments. Although theses lamps can provide the look of a conventional tungsten lamp, the cost is high. Moreover, because many LED wafers are adopted, the voltage and the current are relatively high, and the safety performance of the product is low.

SUMMARY OF THE INVENTION

The present invention provides an LED lamp comprising a light guide plate for solving the problems of high cost and poor product safety in the prior art, while also allowing for light to be emitted in a decorative pattern or in a random fashion. For example, the light guide plate can be constructed to emit light in such a way as to mimic the appearance of an Edison bulb, as shown in FIGS. 13 and 19.

The present invention adopts the following technical schemes:

A light guide plate includes a light guide substrate, wherein the light guide substrate is provided with an incident side wall; and the light guide substrate is at least provided with a side wall intersecting the incident side wall, which has one or more continuous or discontinuous diffuse reflection points.

Total internal reflection is a phenomenon wherein light is totally reflected to an original medium when encountering the interface between an optically thinner (namely light has smaller refractive index in this medium) medium from an optically denser (namely light has larger refractive index in this medium) medium. Diffuse reflection is a phenomenon where light projected to a rough surface is reflected in various directions.

Most of the light entering the light guide plate may be totally reflected by controlling the distance between a light source and the incident side wall. The light which is totally reflected multiple times penetrates through the side wall opposite to the incident side wall, and a small amount of light penetrates through the incident side wall of the light guide substrate. The side wall is provided with diffuse reflection points for affecting or destroying the total reflection at these points, so that light may penetrate through the light guide substrate through the diffuse reflection points. That is, light is emitted at the diffuse reflection points. The light directed to the incident side wall may be from a LED light, so compared with LED wafers connected in series or in parallel that are constructed to look like tungsten filaments, the voltage, current, and price are relatively low.

The diffuse reflection points may be continuous or discontinuous points, the continuous diffuse reflection points form a line or a plane, and the discontinuous diffuse reflection points may form a diffuse reflection area. The diffuse reflection points may be points or lines or planes, any of which can be in various shapes or patterns or random. When a light source directs light to the incident side wall of the light guide substrate, these points, lines, planes, shapes or patterns formed by the diffuse reflection points may transmit light. For example, the diffuse reflection points may cause the light to be emitted in such a way that it mimics the look of an Edison bulb, as shown in FIGS. 13 and 19.

Preferably, the diffuse reflection points are convex points or concave points. The design of the convex points or the concave points affects the smoothness of the side wall of the light guide substrate such that diffuse reflection occurs. The convex points may be machined by injection molding and the like, and the concave points may be machined by processes such as injection molding, laser engraving, single-point diamond machining and the like.

Preferably, the diffuse reflection points are crystals or ink fixed on the side wall of the light guide substrate. The refractive index is changed by the crystals or the ink, so that the total reflection of light in the light guide substrate may be affected such that light exits at the position where the crystal or the ink is located. The crystals or ink may be disposed onto the light guide substrate by processes such as screen printing, photo etching or the like.

Preferably, the diffuse reflection points are formed in the light guide substrate, and the diffuse reflection points are bubbles or particles. Preferably, the particles and bubbles have a light scattering function. The direction of light entering the particles or bubbles is changed by the particles, so that the light exits from the side wall of the light guide substrate.

Preferably, a LED lamp according to the present invention includes:

a mounting seat;

a LED lamp panel arranged on the mounting seat, wherein the LED lamp panel is provided with at least one LED light-emitting unit; and at least one light guide substrate fixed relative to the mounting seat or the LED lamp panel, wherein the light guide substrate is provided with an incident side wall corresponding to the LED light-emitting unit, and the light guide substrate is at least provided with a side wall intersecting the incident side wall, which has one or more continuous or discontinuous diffuse reflection points.

A control circuit for the LED lamp is also arranged on the LED lamp panel.

Preferably, the LED lamp further includes an adapter and a power plug.

Preferably, the mounting seat of the LED lamp is a standard lamp cap and a power switching circuit board arranged in the lamp cap.

Preferably, the cross section of the light guide substrate is crisscross or regularly polygonal.

The light guide substrate, even one with even convex-concave diffuse reflection points may be formed by injection molding, so the process is relatively simple and has the advantage of forming the light guide substrate and the diffuse reflection points at the same time.

The problem of oxidation does not need to be considered by adopting an LED as a light source. Preferably, the LED lamp further includes a diffuser, which may be made of glass or polymer, such as PMMA or the like. A diffuser made of a plastic material may improve the safety of the lamp as compared a glass diffuser. Preferably, the diffuser is fixed relative to the mounting seat, and the light guide substrate is positioned in the diffuser. The diffuser also may protect the light guide substrate and prevent dust and the like from depositing on the light guide substrate to reduce the luminous efficiency.

Preferably, there is a plurality of light guide substrates which are uniformly distributed along the axis of the LED lamp panel.

The LED may be in clearance fit with or be attached to the incident side wall. To improve the utilization rate of light, a groove is preferably formed in the incident side wall of the light guide substrate, and the LED light-emitting unit is arranged in the groove.

Preferably, there are two light guide substrates which are strip-shaped, one of the light guide substrates is provided with an upward notch along its own axis, and the other light guide substrate is provided with a downward notch along its own axis. The two light guide substrates are matched with each other by splicing through the two notches to form a crisscross. The two light guide substrates may be well matched with each other through the upward notch and the downward notch, so that the assembly efficiency is high.

The present invention has at least the following advantages over the prior art:

1, the patterns on the light guide substrate may be complex designs, colored, or set randomly, whereas filaments in a tungsten lamp are restricted in that they need to form a circuit;

2, where the light source is an LED or other low-voltage light source, the product may be made into a Class III lamp (a lamp implementing electric shock protection by extra-low voltage), so that safety and power use is improved; and 3, the manufacturing process can be simple, the production efficiency high, and costs may be effectively reduced.

In which: 1, light source; 2, light guide substrate; 3, concave point; 4, crystal; 5, particle; 6, groove; 7, mounting seat; 9, mounting plate; 10, LED lamp panel; 11, LED light-emitting unit; 12, first light guide substrate; 13, second light guide substrate; 14, diffuser; 15, positioning post; 16, downward notch; 17, upward notch; 18, positioning groove; 19, convex point; 20, lamp cap; 21, power switching circuit board.

DETAILED DESCRIPTION OF THE PREFERRED EMBODIMENTS

The present invention will be described in detail below in combination with the accompanying drawings.

Embodiment 1

Figure 1:
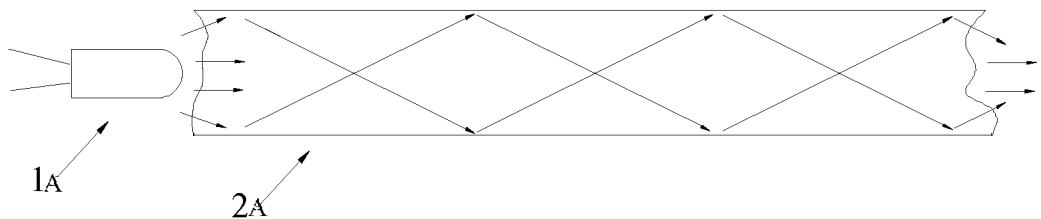
FIG. 1 is a diagram of total reflection of a light guide substrate.

As shown in FIG. 1, light of a light source 1A is totally reflected after entering a light guide substrate 2A, and the light finally penetrates through a side wall opposite to an incident side wall after being totally reflected multiple times.

Figure 2:
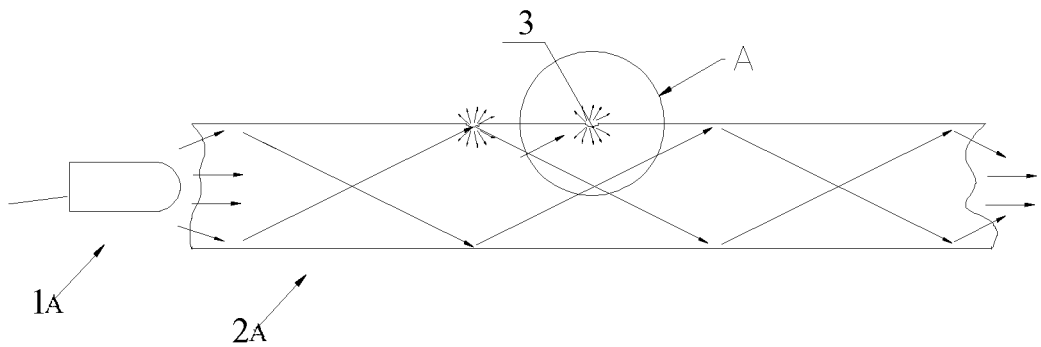
FIG. 2 is a diagram of a light guide substrate with concave points.
Figure 6:
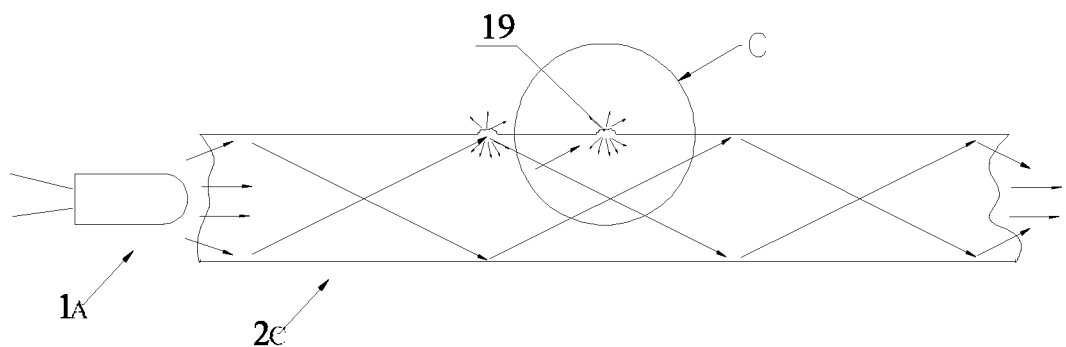
FIG. 6 is a diagram of a light guide substrate with convex points.

As shown in FIG. 2 and FIG. 6, a light guide plate includes the light guide substrate 2A, 2C, wherein the light guide substrate is provided with an incident side wall; and the light guide substrate is at least provided with a side wall intersecting the incident side wall, which has a plurality of continuous or discontinuous diffuse reflection points.

As shown in FIG. 2 and FIG. 6, light emitted by the light source 1A may penetrate through the concave points 3 or the convex points 19, i.e., the concave points or the convex points emit light.

Figure 3:
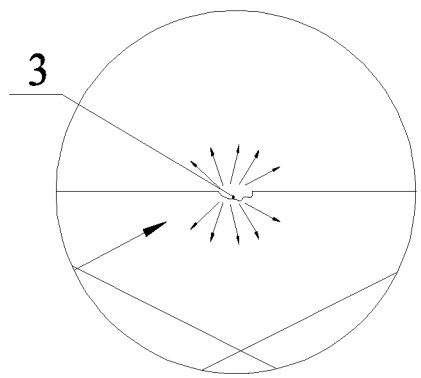
FIG. 3 is an amplified diagram of A in FIG. 2.
Figure 7:
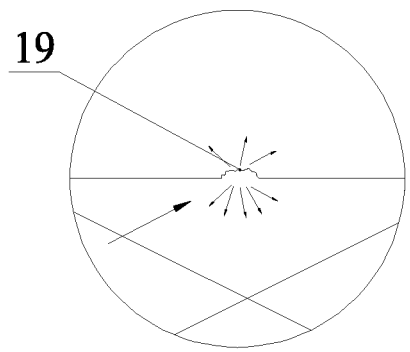
FIG. 7 is an amplified diagram of C in FIG. 6.

As shown in FIG. 3, the diffuse reflection points may be concave points 3. As shown in FIG. 7, the diffuse reflection points may also be convex points 19. The design of the convex points or the concave points may affect the smoothness of the side wall of the light guide substrate such that diffuse reflection occurs. The convex points may be machined by injection molding and the like, and the concave points may be machined by processes such as injection molding, laser engraving, single-point diamond machining and the like.

Figure 9:
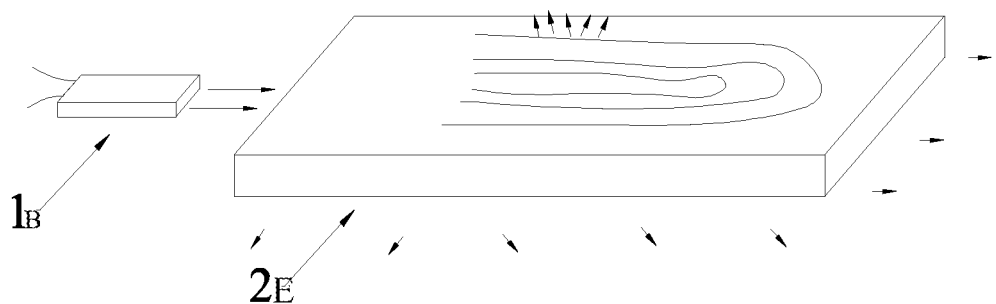
FIG. 9 is a diagram of a light guide substrate.
Figure 11:
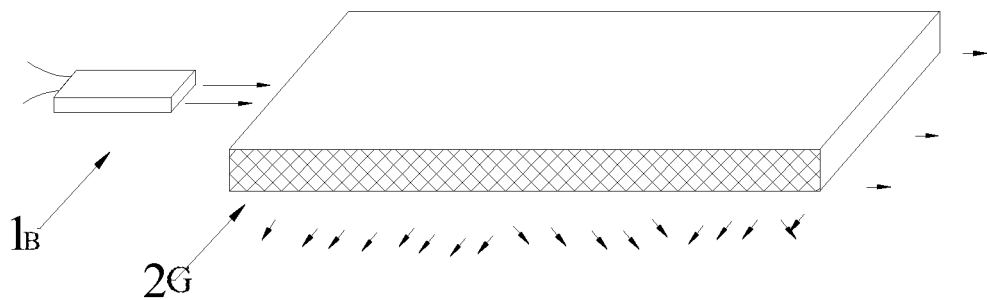
FIG. 11 is a diagram of a light guide substrate with a luminous side wall.
Figure 12:
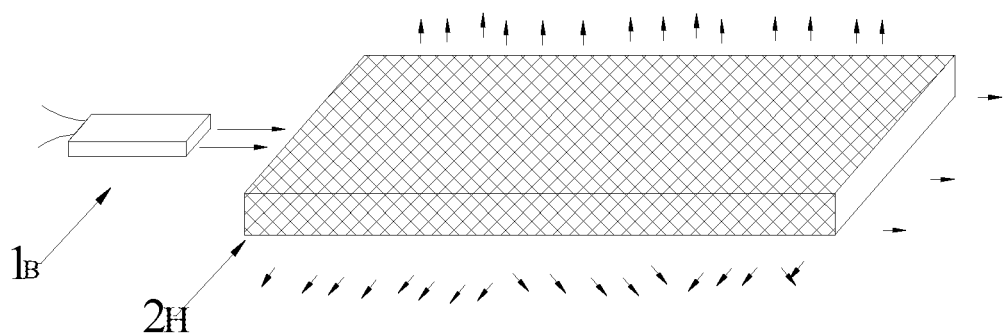
FIG. 12 is a diagram of a light guide substrate with two luminous side walls.

In the present application, as shown in FIG. 9, FIG. 11 and FIG. 12, the diffuse reflection points may be continuous or discontinuous points, the continuous diffuse reflection points form a line or a plane, and the discontinuous diffuse reflection points may form a diffuse reflection area.

Figure 10:
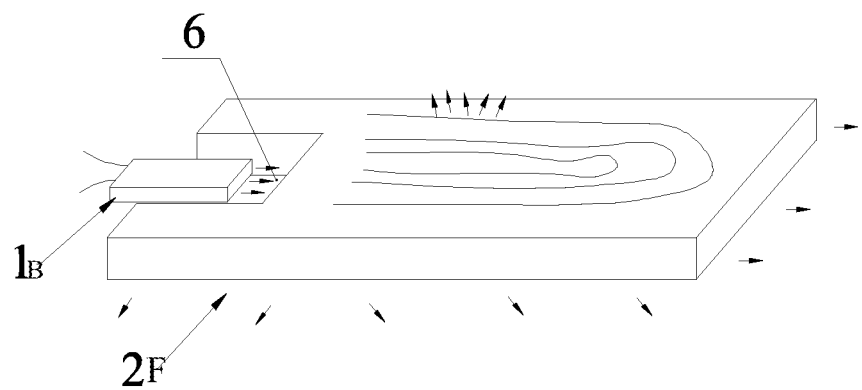
FIG. 10 is a diagram of a light guide substrate with a groove.

As shown in FIG. 10, to improve the utilization rate of light, a groove 6 is formed in the incident side wall of the light guide substrate 2F, and in this way, the light source 1B may be arranged in the groove.

Embodiment 2

Figure 4:
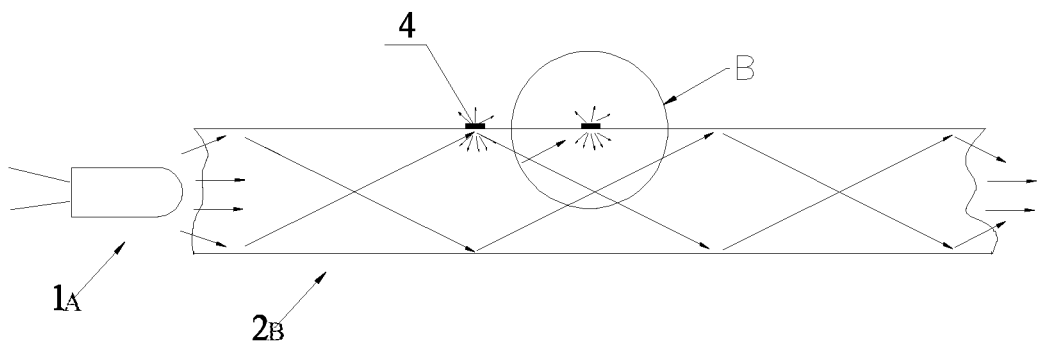
FIG. 4 is a diagram of a light guide substrate with ink or crystal.
Figure 5:
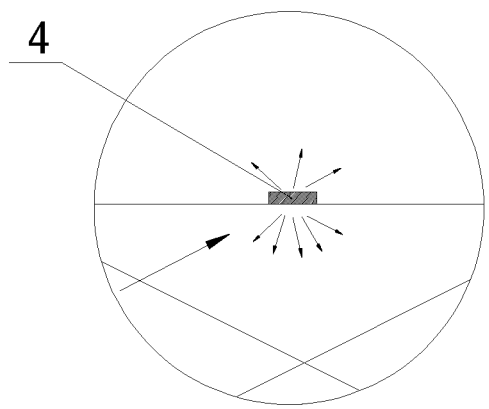
FIG. 5 is an amplified diagram of B in FIG. 4.

As shown in FIG. 4 and FIG. 5, the diffuse reflection points are crystal 4 or ink fixed on the side wall of the light guide substrate. The crystal 4 may be disposed onto the light guide substrate by processes such as screen printing and the like. The crystal in this embodiment may be titanium dioxide. Ink may be disposed onto the light guide substrate by processes such as photoetching and the like.

As shown in FIG. 4, light emitted by the light source 1A may penetrate through the crystal 4, i.e., the crystal 4 emits light.

Embodiment 3

Figure 8:
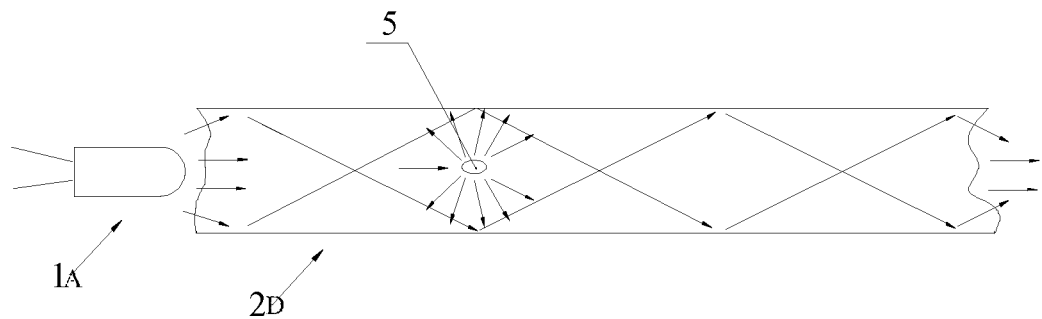
FIG. 8 is a diagram of a light guide substrate with particles.

As shown in FIG. 8, a light guide plate differs from the light guide plates of embodiments 1 and 2 in that diffuse reflection points are not arranged on the side wall of the light guide substrate 2D but arranged in the light guide substrate, and the diffuse reflection points are particles 5 with a scattering function. The particles, the diffuse reflection points may also be formed by bubbles in the light guide substrate.

The direction of light entering the particles may be changed by the particles with the scattering function, so that the light exits from the side wall of the light guide substrate. The total reflection of light in the light guide plate is affected by the diffuse reflection points or the particles such that the light exits from the side wall of the light guide substrate after passing through the diffuse reflection points or the particles.

As shown in FIG. 8, light emitted by the light source 1A changes direction in the particles 5 and then penetrates through the side wall of the light guide substrate.

Embodiment 4

Figure 13:
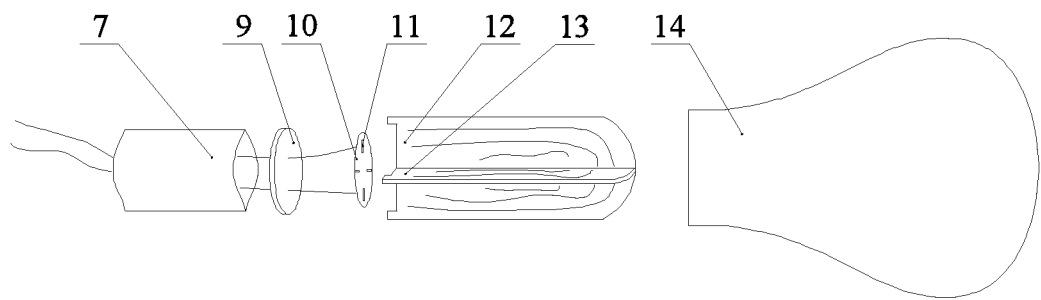
FIG. 13 is an exploded view of an LED lamp.

As shown in FIG. 13, an LED lamp, including:
a mounting seat 7;
an LED lamp panel 10 arranged on the mounting seat, wherein the LED lamp panel is provided with at least one LED light-emitting unit 11;
two light guide substrates 12 and 13 fixed relative to the mounting seat 7, wherein each light guide substrate is provided with an incident side wall corresponding to the LED light-emitting unit 11; and
a diffuser 14 fixed relative to the mounting seat 7, wherein the light guide substrates are positioned in the diffuser.

A mounting plate 9 is fixed in the mounting seat 7 of this embodiment by clamping or bolt connection, and the LED lamp panel 10 is mounted on the mounting plate 9. In this embodiment, a control circuit (not drawn in the figure) for the LED lamp is also arranged on the LED lamp panel. The control circuit may also be arranged on the mounting seat 7 besides being arranged on the LED lamp panel 10.

Figure 14:
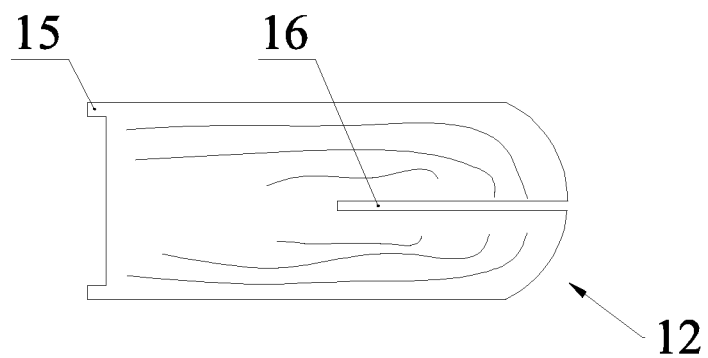
FIG. 14 is a front view of a first light guide substrate.
Figure 15:
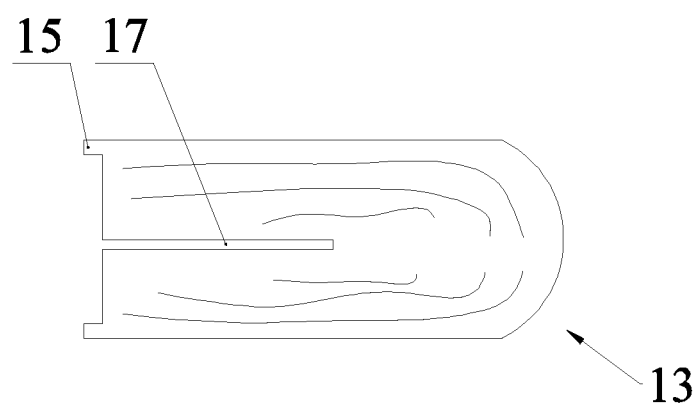
FIG. 15 is a front view of a second light guide substrate.

In this embodiment, the two light guide substrates are respectively a first light guide substrate 12 and a second light guide substrate 13 which are strip-shaped. The first light guide substrate 12 is provided with a downward notch 16 along its own axis, the second light guide substrate 13 is provided with an upward notch 17 along its own axis, as shown in FIG. 14 and FIG. 15. The two light guide substrates are matched with each other by splicing through the two notches to form a crisscross. The two light guide substrates may be well matched with each other through the upward notch and the downward notch, so that the assembly efficiency is high.

Figure 16:
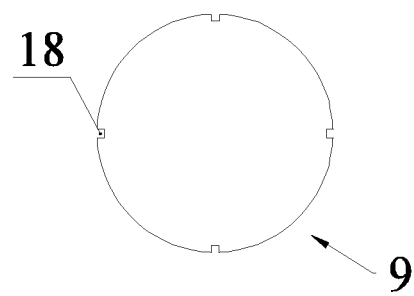
FIG. 16 is a front view of a mounting plate.

As shown in FIGS. 14 to 16, in this embodiment, a positioning post 15 is arranged at each of two ends of the incident side wall of each of the two light guide substrates, and the mounting plate 9 is provided with positioning grooves 18 matched with the positioning posts 15. The two light guide substrates may be fixed through interference fit of the positioning posts 15 and the positioning grooves 18 or fixed through adhesive. The light guide substrates may be fixed on the LED lamp panel 10 according to needs besides being fixed on the mounting plate 9.

The LED light-emitting unit 10 of this embodiment may be in clearance fit with or be attached to the incident side wall. To improve the utilization rate of light, a groove may be formed in the incident side wall of the light guide substrate, and at this time, the LED light-emitting unit is arranged in the groove.

The light guide substrate of this embodiment is at least provided with a side wall intersecting the incident side wall, which has a plurality of continuous or discontinuous diffuse reflection points, and the diffuse reflection points may be convex points or concave points and may also be crystal or ink fixed on the side wall of the light guide substrate. In the light guide substrate of this embodiment, the diffuse reflection points are arranged on the side wall and may also be arranged in the light guide substrate. The diffuse reflection points may be bubbles or particles with a scattering function.

Figure 19:
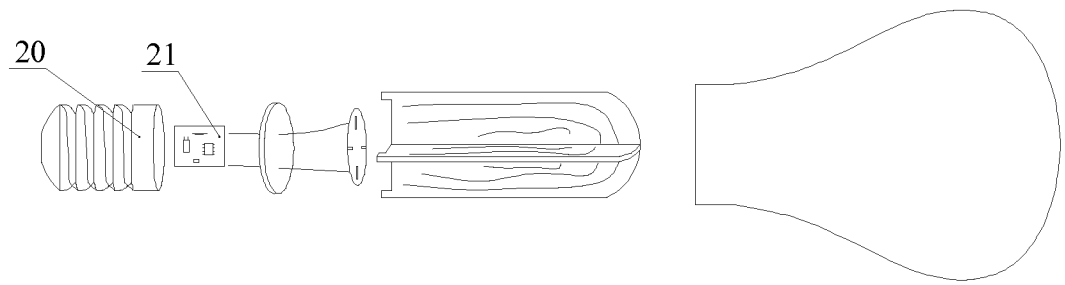
FIG. 19 is an exploded view of another LED lamp.

As shown in FIG. 19, to facilitate installation and use, the mounting seat of the LED lamp may be a lamp cap 20 in which a power converting circuit board 21 is arranged. The lamp cap 20 may have the standard size of E27, B27, E14 or the like.

The diffuse reflection points or the particles of the light guide substrate of this embodiment may be continuous or discontinuous points, the continuous points form a line or a plane, the discontinuous points may form a diffuse reflection area, patterns in various shapes may be formed according to needs during machining, and light exits from the patterns when the LED is on, that is the patterns emit light.

Embodiment 5

Figure 17:
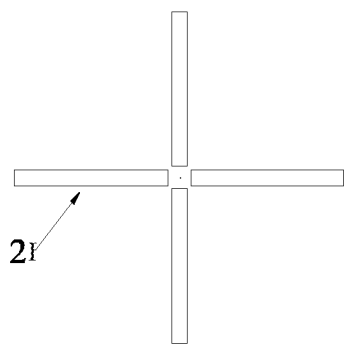
FIG. 17 is a diagram of four light guide substrates.
Figure 18:
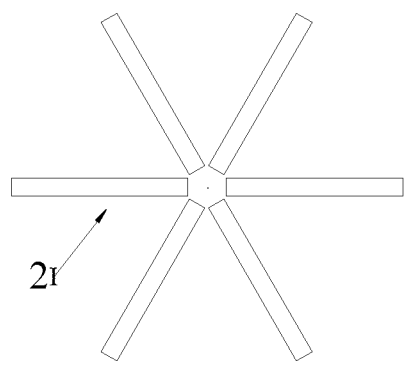
FIG. 18 is a diagram of six light guide substrates.

An LED lamp differs from embodiment 4 in that the quantity and arrangement manner of the light guide substrates are different. There are four or six light guide substrates in this embodiment, and the light guide substrates 21 are uniformly distributed along the axis of the LED lamp panel, as shown in FIG. 17 and FIG. 18. Similar to embodiment 4, each light guide substrate 2I is provided with an incident side wall corresponding to the LED light-emitting unit. To affect the total reflection in each light guide substrate, particles with a scattering function may be included in the light guide substrate or the light guide substrate is at least provided with a side wall intersecting the incident side wall, which has a plurality of continuous or discontinuous diffuse reflection points. When the light guide substrate is provided with the diffuse reflection points, the diffuse reflection points may be convex points or concave points, and may also be crystal or print fixed on the side wall of the light guide substrate.

Embodiment 6

Figure 20:
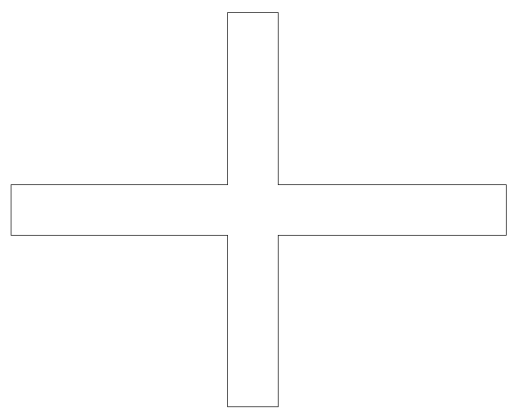
FIG. 20 is a top view of a light guide substrate of which the cross section is crisscross.

An LED lamp differs from embodiment 4 in that there is one light guide substrate, and the cross section of the light guide substrate is crisscross, as shown in FIG. 20. The light guide substrate with such a structure may be directly formed by injection molding, so the process is relatively simple. The cross section of the light guide substrate may be in multiple shapes such as regular polygon and the like besides crisscross, and such cross section is relatively attractive and relatively large in area.

Similar to embodiment 4, the light guide substrate is provided with an incident side wall corresponding to the LED light-emitting unit. To destroy the total reflection in the light guide substrate, particles with a scattering function may be included in the light guide substrate or the light guide substrate is at least provided with a side wall intersecting the incident side wall, which has a plurality of continuous or discontinuous diffuse reflection points. When the light guide substrate is provided with the diffuse reflection points, the diffuse reflection points may be convex points or concave points, or may also be crystal or ink fixed on the side wall of the light guide substrate.

When the light guide substrate adopts convex points or concave points as the diffuse reflection points, convex-concave structures may be formed in an injection mold, and the light guide substrate and the diffuse reflection points are formed at the same time.

The light guide substrate may be made of a material with relatively high refractive index, such as PMMA, PS, glass or the like. The light guide substrate may be in multiple shapes, including regular patterns such as cuboid, cube, cylinder and the like or other irregular patterns.

The light guide substrate is processed to destroy the total reflection thereof, so that the propagation of light is changed.

The aforementioned descriptions are merely preferred embodiments of the invention, and the scope of the invention is not limited thereto.

What is claimed is:

1. A lamp comprising:
a LED lamp panel comprising at least one light-emitting diode;
a light guide comprising a first substrate and a second substrate, wherein the first and second substrate each comprises an incident side wall proximal to one of the at least one light-emitting diode, a side wall intersecting the incident side wall, and at least one diffuse reflection point;
a lamp cap comprising external threads and sized and shaped to be received within a lamp socket;
a power converting circuit board positioned within the lamp cap;
a diffuser positioned around the light guide, the diffuser further comprising a first region with a first diameter and a second region with a second diameter, wherein the first diameter is smaller than the second diameter, and
a mounting plate comprising a first pair of grooves, wherein the first substrate has a first pair of positioning posts and wherein the first pair of positioning posts are sized and shaped to be received within the first pair of grooves for retaining the light guide on the mounting plate.

2. A lamp comprising:
a LED lamp panel comprising at least one light-emitting diode;
a light guide comprising a first substrate and a second substrate, wherein the first and second substrate each comprises an incident side wall proximal to one of the at least one light-emitting diode, a side wall intersecting the incident side wall, and at least one diffuse reflection point;
a lamp cap comprising external threads and sized and shaped to be received within a lamp socket;
a power converting circuit board positioned within the lamp cap;
a diffuser positioned around the light guide, the diffuser further comprising a first region with a first diameter and a second region with a second diameter, wherein the first diameter is smaller than the second diameter, and
wherein the first substrate has a first notch along an axis of the first substrate sized and shaped to receive the second substrate,
wherein the second substrate has a second notch along an axis of the second substrate sized and shaped to receive the first substrate, and
wherein the first and second substrates are coupled together by splicing the first and second notches.

3. The lamp of claim 2, wherein the diffuser comprises a third diameter disposed between the first diameter and the second diameter, wherein the third diameter is larger than the first diameter and the third diameter is smaller than the second diameter.

4. The lamp of claim 2, wherein the at least one diffuse reflection point comprises a convex point or a concave point disposed on the side wall intersecting the incident side wall of at least one of the first and second substrates.

5. The lamp of claim 2, wherein the first substrate has a notch and the second substrate has a notch, wherein the first and second substrates connect to each other by splicing of the notches.

6. The lamp of claim 2, wherein the at least one diffuse reflection point comprises a bubble disposed within at least one of the first and second substrates.

7. The lamp of claim 2, wherein the at least one diffuse reflection point comprises particles disposed within at least one of the first and second substrates.

8. The lamp of claim 2, further comprising:
a groove in the incident side wall of at least one of the first and second substrates, wherein one of the at least one light-emitting diode is at least partially located within the groove.

* * * * *